May 2, 1961 K. T. KSIESKI ET AL 2,982,299
BALANCED POPPET VALVE
Filed May 21, 1958

INVENTORS:
KAZIMIERZ T. KSIESKI
SAMUEL D. BURTON
BY J. N. Wolfram
ATTORNEY

United States Patent Office 2,982,299
Patented May 2, 1961

2,982,299

BALANCED POPPET VALVE

Kazimierz T. Ksieski and Samuel D. Burton, Los Angeles, Calif., assignors to Parker-Hannifin Corporation, Cleveland, Ohio, a corporation of Ohio Filed May 21, 1958, Ser. No. 736,744

6 Claims. (Cl. 137—454.6)

This invention relates to balanced poppet valves and more particularly to a balanced pilot valve such as may be used to control a main fluid pressure operated valve through which a tank may be filled and which is automatically closed when the tank has been filled to a predetermined level.

In tank filling systems of this type, incoming liquid acts on the underside of the main valve and tends to open the same. Liquid is also directed through a restricted orifice to the back side of the valve. The pilot valve controls exhausting of the liquid from the back side through a pilot line which is of larger flow capacity than the restricted orifice. Thus when the pilot valve is closed, liquid pressure builds up on the back side of the main valve to close the same and when the pilot valve is open liquid can exhaust from the back side faster than it can enter through the restricted orifice and the main valve remains open.

The pilot valve may be opened and closed by a float, solenoid or some other means responsive to a predetermined liquid level within the tank. When operated by a float, the pilot valve is closed by the buoyancy of the float and is opened by the weight of the float. When operated by a solenoid, the valve may be closed by movement of the armature when the solenoid is energized and opened by the weight of the armature and/or the action of a spring. In either case, it is of advantage to keep the force necessary for operating the pilot valve to a minimum since a lighter and less bulky float or a lighter, smaller, and less power consuming solenoid can be utilized. This is of particular importance in aircraft and missile installations. A balanced pilot valve, since it is substantially insensitive to static and dynamic pressures of the fluid in the pilot line, requires little force to operate and hence is desirable from this standpoint.

Also, the larger the size of the main valve, the greater the quantity of fluid which must be directed to the back side of the main valve for shutting off the valve without increasing the time between shutoff of the pilot valve and shutoff of the main valve. This requires a correspondingly larger orifice leading to the back of the main valve and hence also requires a larger pilot line and larger pilot valve. The larger pilot valve likewise requires a larger float or solenoid if the pilot valve is not of the fluid pressure balanced type. Hence, the larger the main valve, the more advantageous to use a balanced pilot valve.

Previous attempts to use balanced pilot valves for this purpose in aircraft fuel systems and other systems requiring high standards of performance and reliability have not been very successful because they either incorporated close sliding fits which not only do not shut off completely tight but also are prone to stick due to access of contaminant between the sliding fits, or they incorporated a pair of simultaneously seating poppet valves which required prohibitively close machining tolerances to secure the required alignment and spacing of the valve seats and were also difficult to assemble.

The present invention seeks to avoid these difficulties by providing a balanced pilot valve of the double poppet type which is easy to machine and to assemble.

Another object is to provide a poppet type balanced pilot valve which readily adjusts itself to misalignment of the seats.

Another object is to provide a pilot valve of the type described which has no close sliding fits between relatively moving parts.

Another object is to provide a balanced pilot valve in which the seats and valve poppets are insertible and removable from the valve housing as a unit.

Another object is to provide a balanced poppet type pilot valve in which a single poppet member provides two spaced valve faces respectively engageable with spaced valve seats and one of the valve faces may be passed through the seat for the other valve face whereby the poppet member may be readily assembled and disassembled from the seat member.

Other objects are apparent from the following description and from the drawings in which.

Figure 1:
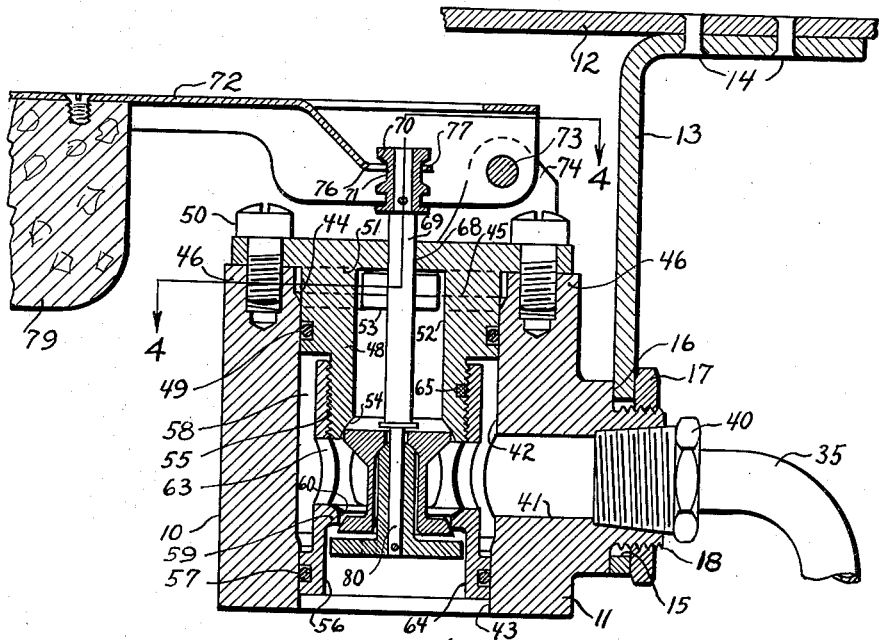
Figure 1 is a cross section view of the pilot valve as attached to the top wall of a tank.
Figure 3:
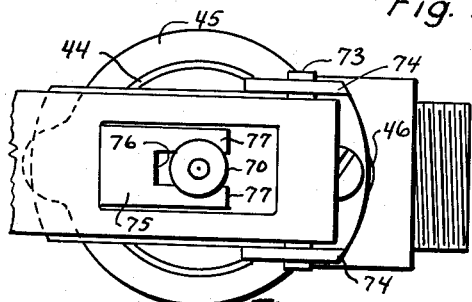
Figure 3 is a fragmentary plan view of the pilot valve.

As shown in Figure 1, the balanced pilot valve, generally designated as 10, has a body 11 which may be secured to the top wall 12 of a tank by any suitable means. The means shown in the drawing comprises a bracket 13 attached to the tank wall 12 by rivets 14. The pilot valve 10 is secured to the bracket 13 by passing a threaded extension 18 through an opening 15 in the bracket and clamping the bracket against a shoulder 16 on the pilot valve body by means of a nut 17.

Figure 2:
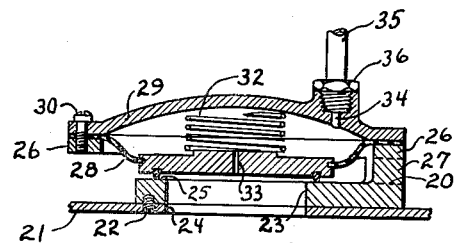
Figure 2 is a somewhat diagrammatic cross section view in smaller scale of a main valve to be controlled by the pilot valve.

Figure 2 illustrates a main fluid pressure operated valve to be controlled by the pilot valve 10. The main valve may include a body section 20 attached to the bottom wall 21 of the tank by means of screws 22. The body 20 has an inlet opening 23 in register with an opening 24 in the tank through which liquid may be introduced for filling the tank. The body 20 also has an annular valve seat 25 surrounding the inlet 23. The body 20 also has an annular ring-like section 26 spaced from the seat 25 and supported by several spider elements 27 spaced about the circumference of the ring-like member 26.

A flexible diaphragm 28 is clamped to the ring-like member 26 by means of a cap 29 and screws 30. Attached to the diaphragm is a movable valve member 31, which with the diaphragm 28 and the cap 29 defines a pressure chamber 32. A restricted orifice 33 connects the inlet 23 with the pressure chamber 32. A pilot line opening 34 connects the pressure chamber 32 with a pilot line, or tube, 35 which is attached to the cap 29 by a suitable fitting 36.

The opposite end of the pilot line 35 is connected by means of a fitting 40 to inlet port 41 in the pilot valve which intersects a bore 42. At its lower end, the bore 42 is reduced somewhat in diameter as at 43 and is open to the exterior of the body 11. The other end of the bore 42 terminates in a chamfer 44 leading to an upper face 45 on the body 11. A pair of lugs 46 project outwardly of the face 45.

A first seat member 48 is mounted within the bore 42 and is sealed thereagainst by a rubberlike packing ring 49. The seat element 48 is attached to the lugs 46 by means of screws 50. Two slots 51 are milled into opposite side walls of the seat element 48 and intersect a central bore 52 in the seat element to form a pair of rectangular openings 53 which connect the bore 52 with the exterior of the housing 11 past the chamfer 44 and face 45.

At the lower end of the bore 52 is a stationary valve seat 54 formed on a spherical radius with the center of sphericity lying on the longitudinal axis of such seat.

Attached to the first seat element 48 by means of a threaded connection 55 is a second seat element 56 which is sealed against the bore portion 43 by means of a packing 57. The seat element 56 has its inner end spaced from the bore 42 so as to provide an annular fluid passage 58.

Intermediate the ends of the seat element 56 there is an inturned flange 59 having an opening 60 therethrough. The intersection of the opening 60 and the lower surface 61 of the flange 59 forms a second stationary seat 62 which faces in the same direction as the spherical seat 54 and is spaced therefrom. A series of openings 63 connects the interior of the seat member 56 between the stationary seats 54 and 62 with the annular chamber 58. A counterbore 64 leads from the seat 62 to the exterior of the housing 11 through the bore 43. A plastic plug 65 provides a means for locking the threaded connection between the seat elements 48 and 56 when the seats 54 and 62 are spaced apart to a predetermined desired extent.

Extending through an opening 68 in the seat member 48 is a valve operating stem 69. Attached to the upper end of the stem is a spool like member 70 having an annular groove 71. A float arm 72 is pivotally mounted by means of a pin 73 to a pair of upstanding lugs 74 formed on the seat member 48. The float arm 72 has a tongue 75 which is slotted as at 76 to provide fingers 77 receivable in the groove 71 of the member 70. The fingers 77 engage the sides of the groove 71 for lifting or lowering the operating stem 69. Attached to the float arm 72 is a float 79 of buoyant material such as cork or unicellular hard rubber.

Figure 5:
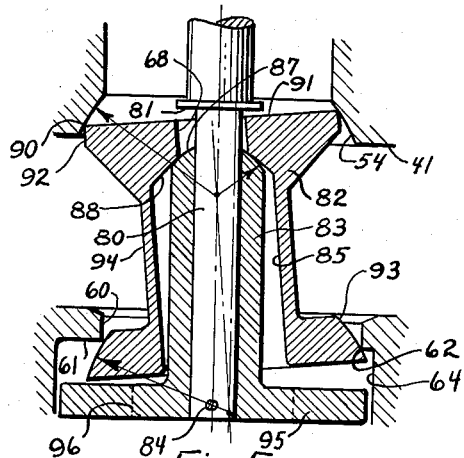
Figure 5 is an enlarged fragmentary section view showing how the pilot valve adjusts for misalignment of its valve seats.
Figure 4:
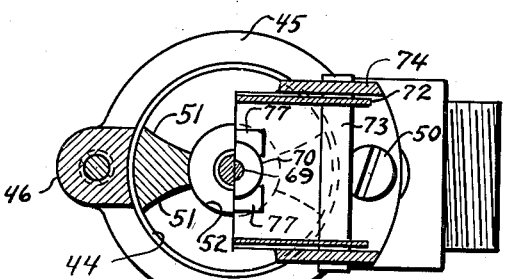
Figure 4 is a fragmentary section view of the pilot valve along the lines 4—4 of Figure 1.

The lower end of the operating stem 69 is reduced in diameter as at 80 to form an abutment shoulder 81. A valve poppet 82 is loosely mounted on the lower end of the valve operating stem 69 and is retained thereon by a member 83 pinned to the operating stem by a pin 84. The bore 85 in the poppet has substantial clearance with the reduced end 80 of the stem and the counterbore 85 in the poppet has substantial clearance with the outer diameter of the member 83 so as to permit a relatively substantial tilting of the poppet with respect to the stem 69, as illustrated in Figure 5. The poppet is retained in a position close to the abutment shoulder 81 by means of a spherical surface 87 on the inner end of the member 83 in engagement with an internal conical shoulder 88 on the poppet. The center of sphericity of the surface 87 coincides with that of the spherical seat 54.

The poppet 82 has a sharp edge valve seat engaging portion 90 formed by the intersection of a transverse end face 91 and a circular outer face 92. Spaced from the valve seat engaging portion 90 and facing in the same direction, is a convex spherical valve seat engaging portion 93 whose center of sphericity lies on the longitudinal axis of the poppet and, when the latter is in seated position, is spaced from the center of sphericity of the seat 54. The intermediate portion of the poppet is reduced in diameter as at 94.

The lower end of the member 83 has several spider-like fingers 95 with spaces 96 therebetween to permit the free passage of fluid. The fingers 95 provide a loose guide within the bore 64 to prevent excessive sideward movement of the lower end of the stem 69 when the poppet 82 is unseated.

The poppet 82 is substantially balanced against fluid pressure when in the closed position. This is accomplished by making the diameter of the poppet valve seat engaging portion 90 substantially the same in diameter as the stationary seat 60 so that when the poppet is seated the area of the poppet at the lower end thereof subject to fluid pressure from the inlet port 41 and tending to unseat the poppet is substantially equal to the area at the outer end of the poppet which is bounded by the seat 90 and subject to pressure of the fluid within the inlet port 41 tending to maintain the poppet seated. However, in order to facilitate ready assembly of the parts, the diameter of the external surface 92 of the poppet, and hence the diameter of the poppet valve seat engaging portion 90 is a few thousandths of an inch less than the opening 60 so as to permit the diameter 92 to be passed through the opening 60. In assembling the valve, the poppet 82 and the member 83 assembled with the stem 69 and secured by means of a cotter pin 84 are inserted through the lower end of the seat element 56, the latter having previously been partially threaded onto the seat element 48. The seat elements are then threaded together further until the spaced seats 62 and 54 seat simultaneously on the poppet valve seat engaging portions 90 and 93.

By making one seat of each pair of engaging seats spherical and spacing the centers of sphericity, assurance is had that both pairs of seats will engage properly about the complete circular contact line even though because of machining inaccuracies the stationary seats 54 and 62, or the poppet valve seat engaging portions 90 and 93, are not perfectly concentric, or if the axes of the poppet or stationary seats are angularly misaligned.

Thus, as clearly shown in Figure 5, when the spherical seat 54 is not perfectly concentric with the seat 62, the poppet 82 will tilt as shown to find itself with both pairs of seats in proper engagement. The lower end of the poppet will be properly seated with the spherical seat 93 in full line contact with seat 61 because the center of sphericity of the seat engaging portion 93 now lies on the longitudinal axis of the seat 62. Likewise the upper poppet valve seat engaging portion 90 will be in complete line contact with the spherical seat 54 when the center of sphericity of seat 54 lies on the longitudinal axis of the seat engaging portion 90.

It will be noted that by removing screws 50 the seat members 48 and 56 together with the parts internal thereof may be removed and replaced as a unit from the body 11. This permits the parts in such unit to be assembled, adjusted, and tested independently of the valve body and also facilitates servicing of any valves which might become defective.

In operation, when the tank is not full and fluid is introduced to the main valve of Figure 2 through the inlet port 23, the pressure of the incoming fluid raises the valve member 31 and the fluid flows into the tank past the valve seat 25 and between the spaced lugs 27. At the same time, a small portion of the incoming fluid passes through the restricted orifice 33 into the chamber 32 and then into the passage 34 and the pilot line 35.

During this time, the float 79 is held in a downward position by gravity and the tongues 77 hold the operating stem 69 of the pilot valve in a lowered position in which the shoulder 81 has unseated the poppet 82 from the stationary seats 54 and 62. Fluid from the pilot line 35 enters the pilot valve bore 41 and passes through the bore 42 and openings 63 into the interior of the seat element 56. A portion of the fluid passes through the opening 60 past the seat 62 and through the counterbore 64 to the interior of the tank. At the same time, another part of the fluid flows past the seat 54 into the opening 52 and into the tank through the openings 53.

When the tank has been filled to a predetermined level, the float 79 raises, lifting the stem 69 to seat the poppet 82 on both stationary seats 54 and 62 to stop the flow from the pilot line 35. This causes a build up of pressure of the fluid within chamber 32 which acts on the back side of the valve 31 to close the same whereby filling of the tank is stopped. When the liquid level subsequently drops, the float drops by gravity and opens the pilot valve in readiness for the next filling operation.

Since the pressure of the fluid from port 41 acting to move the lower end of the poppet away from the seat 61 is substantially counterbalanced by the pressure of the fluid acting on the upper portion of the poppet tending to seat the same against the seat 54 during the time that the poppet is both open and closed, relatively little force is required to move the poppet to or from closed position, and hence both the weight of the float required for opening the pilot valve and the float buoyancy required for closing the valve can be kept to a minimum.

We claim:

1. In a valve, a housing member having a flow passage and having first and second spaced seat portions exposed to said flow passage, a movable valve member in said housing having first and second seat engaging portions adapted to engage said first and second seat portions, respectively, said first seat portion and said first seat engaging portion being disposed uppermost and forming a first valve assembly, said second seat portion and said second seat engaging portion forming a second valve assembly, one portion of each of said valve assemblies being part spherical and the other portion being in the shape of a narrow ring, and operating means for moving said valve member into and out of engagement with said seat portions for closing and opening said flow passage, said operating means including a valve stem projecting into and loosely connected to said valve member for relative pivotal movement, the connection between said valve member and said valve stem including part spherical shoulders on said valve member and said valve stem disposed axially between said first and second seat engaging portions, said shoulders having a common center of sphericity coincidental with the center of sphericity of the part spherical portion of said first valve assembly at least when said valve member is engaged with said valve seat portions.

2. A valve in accordance with claim 1 wherein said valve stem has an enlarged lower portion engageable with a lower part of said valve member to limit the swinging thereof.

3. A valve comprising a housing having a bore therethrough, an inlet passage opening into said bore, a valve seat unit, said valve seat unit including an upper valve seat member supported by said housing and depending into said bore, sealing means sealing said upper valve seat member relative to said housing within said bore, a lower valve seat member suspended from said upper valve seat member within said bore below said upper valve seat member, second sealing means sealing said lower valve seat member relative to said housing within said bore, said valve seat unit being tubular and having at least one intermediate transverse opening communicating the interior of said valve seat unit with said inlet passage, and said valve member disposed within said valve seat unit and cooperating with said valve seat members to close opposite ends of said valve seat unit, said lower valve seat member being slidable relative to said housing within said bore and said upper valve seat member and said lower valve seat member having telescoped threadedly engaged portions, whereby said lower valve seat member may be adjusted relative to said upper valve seat member within said housing while maintaining the seal with said housing.

4. A valve in accordance with claim 3 wherein said upper valve seat member has an upper valve seat portion, said lower valve seat member has a lower valve seat portion, said valve member has upper and lower valve seat engaging portions, and a valve stem projecting into and loosely connected to said valve member for relative pivotal movement, said upper valve seat portion being part spherical and said upper valve seat engaging portion being in the shape of a narrow ring, the connection between said valve member and said valve stem including complementary part spherical shoulders on said valve member and said valve stem, and said shoulders having a common center of sphericity disposed axially between said first and second seat engaging portions and coincidental with the center of sphericity of said upper valve seat portion at least when said valve member is engaged with said valve seat portions.

5. A valve in accordance with claim 4 wherein said lower valve seat engaging portion is also part spherical and has a center of sphericity spaced from the first mentioned center of sphericity.

6. A valve in accordance with claim 1 wherein the center of sphericity of the part spherical portion of said second valve assembly is spaced from the first mentioned center of sphericity.

References Cited in the file of this patent

UNITED STATES PATENTS

| | | |
|---|---|---|
| 340,112 | Gridley | Apr. 20, 1886 |
| 783,528 | Kipp | Feb. 28, 1905 |
| 1,484,668 | Partlow | Feb. 26, 1924 |
| 2,117,044 | Spence | May 10, 1938 |
| 2,347,351 | Laing | Apr. 25, 1944 |
| 2,853,101 | Williams | Sept. 23, 1958 |
| 2,897,836 | Peters | Aug. 4, 1959 |

FOREIGN PATENTS

| | | |
|---|---|---|
| 444,010 | Great Britain | Mar. 4, 1936 |